United States Patent
Tanaka

(10) Patent No.: US 9,919,869 B2
(45) Date of Patent: Mar. 20, 2018

(54) AUTOMATED WAREHOUSE AND OPERATING METHOD FOR THE SAME

(71) Applicant: MURATA MACHINERY, LTD., Kyoto-shi, Kyoto (JP)

(72) Inventor: Hiroshi Tanaka, Inuyama (JP)

(73) Assignee: MURATA MACHINERY, LTD., Kyoto (JP)

(\*) Notice: Subject to any disclaimer, the term of this patent is extended or adjusted under 35 U.S.C. 154(b) by 0 days.

(21) Appl. No.: 14/957,695

(22) Filed: Dec. 3, 2015

(65) Prior Publication Data
US 2016/0176633 A1 Jun. 23, 2016

(30) Foreign Application Priority Data

Dec. 19, 2014 (JP) .................................. 2014-257686

(51) Int. Cl.
*B65G 1/06* (2006.01)
*B65G 1/04* (2006.01)

(52) U.S. Cl.
CPC .................................. *B65G 1/0407* (2013.01)

(58) Field of Classification Search
CPC ................ B65G 1/0407; B65G 1/0421; B65G 1/043586; B66F 9/072
See application file for complete search history.

(56) References Cited

U.S. PATENT DOCUMENTS

| | | | | |
|---|---|---|---|---|
| 3,490,616 A | * | 1/1970 | Castaldi | B65G 1/0421 414/273 |
| 3,786,943 A | * | 1/1974 | Coppel | B65G 1/0421 414/273 |
| 3,790,006 A | * | 2/1974 | Hartman, III | B65G 1/0421 318/603 |
| 4,614,274 A | * | 9/1986 | LaValle | B66C 13/22 212/285 |
| 4,964,776 A | * | 10/1990 | Wakita | B65G 1/0407 414/277 |
| 5,024,571 A | * | 6/1991 | Shahar | B65G 1/0414 414/231 |
| 5,466,109 A | * | 11/1995 | Iizuka | H01L 21/67769 414/283 |
| 6,224,313 B1 | * | 5/2001 | Fukushima | B65G 1/0407 414/280 |
| 7,575,407 B2 | * | 8/2009 | Tsujimoto | B65G 1/0407 414/279 |
| 7,787,985 B2 | * | 8/2010 | Tsujimoto | B65G 1/06 414/273 |

(Continued)

FOREIGN PATENT DOCUMENTS

| JP | 2008-063133 A | 3/2008 |
|---|---|---|
| JP | 4273423 B2 | 6/2009 |

(Continued)

*Primary Examiner* — Mark C Hageman
(74) *Attorney, Agent, or Firm* — Keating & Bennett, LLP

(57) ABSTRACT

A power supply and a controller are arranged at positions different from a stacker crane and deviated from an extended line of a travelling route, and are connected to the stacker crane via a cable. The moving mechanism, the travelling motor, the transfer mechanism and the lifting motor are each arranged at the same position as an one-side end portion of the mast or arranged on the other side from the end portion in the extending direction of the travelling route.

11 Claims, 11 Drawing Sheets

(56) References Cited

U.S. PATENT DOCUMENTS

| | | | |
|---|---|---|---|
| 7,959,396 B2 * | 6/2011 | Izumi | B65G 1/0421 |
| | | | 414/273 |
| 8,162,585 B2 * | 4/2012 | Tsujimoto | B65G 1/0407 |
| | | | 414/273 |
| 2004/0042887 A1 * | 3/2004 | Tai | B66F 9/072 |
| | | | 414/631 |
| 2005/0053450 A1 * | 3/2005 | Kantola | B65G 1/0407 |
| | | | 414/273 |
| 2006/0276930 A1 | 12/2006 | Tsujimoto et al. | |
| 2007/0032903 A1 | 2/2007 | Tsujimoto | |
| 2015/0336472 A1 | 11/2015 | Tanaka | |
| 2015/0353281 A1 | 12/2015 | Tanaka | |

FOREIGN PATENT DOCUMENTS

| | | |
|---|---|---|
| JP | 2010-143757 A | 7/2010 |
| WO | 2014/129066 A1 | 4/2014 |
| WO | 2014/125727 A1 | 8/2014 |

* cited by examiner

AUTOMATED WAREHOUSE AND OPERATING METHOD FOR THE SAME

BACKGROUND OF THE INVENTION

1. Field of the Invention

The present invention relates to an automated warehouse for storing articles, and a method for operating the automated warehouse.

2. Description of the Related Art

As an example of the automated warehouse described above, there is known an automated warehouse provided with a stacker crane for carrying an article (e.g., see Unexamined Japanese Patent Publication No. 2010-143757). In such an automated warehouse, the stacker crane moves along a plurality of shelves and carries articles between reception and shipment ports and the shelves.

The automated warehouse as described above has been required to have a dead space as small as possible, the dead space being an area incapable of taking in and out the article by the stacker crane.

SUMMARY OF THE INVENTION

Accordingly, preferred embodiments of the present invention provide an automated warehouse capable of reducing a dead space, and a method for operating the automated warehouse.

An automated warehouse according to a preferred embodiment of the present invention includes a plurality of shelves on which articles are stored; a first stacker crane that travels along a travelling route, to take an article on and out of each of the shelves arranged in an extending direction and a vertical direction of the travelling route; a power supply that supplies electric power to the first stacker crane; and a controller that controls the first stacker crane. In the automated warehouse, the power supply and the controller are arranged at positions different from the first stacker crane and deviated from an extended line of the travelling route, and are connected to the first stacker crane via a first cable. The first stacker crane includes a first moving mechanism including a first driving wheel that moves by rolling along the travelling route, a first travelling driver that drives the first driving wheel, a first mast that is vertically provided in the vertical direction above the first moving mechanism, a first transfer mechanism including a first lift provided movably along the first mast, and a first in-and-out moving mechanism arranged on the first lift and provided movably toward and away from the shelf, and a first lifting driver that drives the first lift. The first moving mechanism, the first travelling driver, the first transfer mechanism and the first lifting driver are each arranged at the same position as an one-side end portion of the first mast or arranged on the other side from the one-side end portion in the extending direction of the travelling route.

With this configuration, there is no need to provide the power supply and the controller in the first stacker crane, thus enabling reduction in number of devices mounted in the first stacker crane. The first moving mechanism, the first travelling driver, the first transfer mechanism and the first lifting driver which are mounted in the first stacker crane are each arranged at the same position as the one-side end portion of the first mast or arranged on the other side from the one-side end portion in the extending direction of the travelling route. In other words, the first moving mechanism, the first travelling driver, the first transfer mechanism and the first lifting driver are not arranged on the one side from the one-side end portion of the first mast in the extending direction of the travelling route. This leads to a reduction in area in which the device protrudes to the one side from the one-side end portion of the first mast. As a result, it is possible to reduce a dead space that is generated in association with this area. Further, with this configuration, each of the power supply and the controller is arranged at the position deviated from the extended line of the travelling route, thus eliminating the need to provide an area for arranging each of the power supply and the controller in a direction along the extending direction of the travelling route. As a result, it is possible to reduce a dead space that is generated in association with this area.

In an automated warehouse according to a preferred embodiment of the present invention, the first moving mechanism, the first travelling driver, the first lifting driver and the first cable may be provided below a storage area in which the article is stored on the shelf.

With this configuration, it is possible to effectively use a space below the storage area, which often becomes a dead space.

In an automated warehouse according to a preferred embodiment of the present invention, the shelf arranged at the one-side end along the extending direction of the travelling route out of the plurality of shelves may be arranged at a position, on and out of which the article can be taken by the first stacker crane that stops at the one-side end of the travelling route.

With this configuration, when the first stacker crane stops at one end of the travelling route and transfers the article to or from the shelf arranged at the one-side end along the extending direction of the travelling route, only the first mast protrudes from the shelf to the one side in the extending direction of the travelling route. In other words, when only an area that allows the first mast to escape is provided in the automated warehouse, it is possible to transfer the article to and from the shelf arranged at the one-side end along the extending direction of the travelling route. Thus, when the article is to be transferred to or from the shelf at the one-side end in the extending direction of the travelling route, a portion of a region other than the first mast, which protrudes from the shelf, is reduced, thus enabling reduction in an area that becomes a dead space.

In an automated warehouse according to a preferred embodiment of the present invention, the first travelling driver and the first lifting driver may be arranged so as to project in a direction intersecting with the extending direction and the vertical direction of the travelling route.

With this configuration, when the first travelling driver and the first lifting driver are to be arranged on the other side from the one-side end portion of the first mast, it is possible to reduce an amount of projection to the other side from the one-side end portion of the first mast.

In an automated warehouse according to a preferred embodiment of the present invention, below the shelf at the lowest level, the first travelling driver and the first lifting driver may be arranged so as to project to positions overlapping with a storage area in which the article is stored on the shelf when viewed from the vertical direction.

In this configuration, an area below the shelves is used as a passage area for each of the first travelling driver and the first lifting driver at the time of movement of the first stacker crane. Accordingly, when the first travelling driver and the first lifting driver are to be arranged on the other side from the one-side end portion of the first mast, it is possible to reduce a quantity of projection to the other side from the one-side end portion of the first mast.

In an automated warehouse according to a preferred embodiment of the present invention, the first moving mechanism may include a first guiding wheel that is arranged on the other side with respect to the first driving wheel in the extending direction of the travelling route and moves by rolling along the travelling route, and a pair of first supports which is arranged on the other side with respect to the first driving wheel in the extending direction of the travelling route and arranged with the travelling route located therebetween in a width direction intersecting with the extending direction and the vertical direction of the travelling route, and supports the first guiding wheel, and a space into which the first lift is able to enter from the vertical direction may be provided between the pair of first supports in the width direction.

With this configuration, the first lift is able to enter, from the vertical direction, the space which is provided between the pair of first supports in the width direction, thus to allow lowering of the first lift to a relatively low position. Hence it is possible to lower an installation start position of the shelves, so as to increase the number of shelves.

In an automated warehouse according to a preferred embodiment of the present invention, as the first driving wheel, only one wheel may be arranged so as to overlap with the first mast when viewed from the vertical direction.

With this configuration, it is possible to further reduce a quantity of projection to the other side from the one-side end portion of the first mast in the extending direction of the travelling route. As a result, the second stacker crane, which is arranged on the other side in the extending direction of the travelling route of the first stacker crane while facing the first stacker crane, is able to be arranged more closely.

An automated warehouse according to a preferred embodiment of the present invention may further include a second stacker crane that is arranged on the other side with respect to the first stacker crane in the extending direction of the travelling route, and travels along the travelling route, to take the article on and out of the shelf. In the automated warehouse, the power supply may supply electric power to the second stacker crane. The controller may control the second stacker crane. The power supply and the controller may be connected to the second stacker crane via a second cable. The second stacker crane may include a second moving mechanism including a second driving wheel that moves by rolling along the travelling route, a second travelling driver that drives the second driving wheel, a second mast that is vertically provided in the vertical direction above the second moving mechanism, a second transfer mechanism including a second lift provided movably along the second mast and including a second in-and-out moving mechanism arranged on the second lift and provided movably toward and away from the shelf, and a second lifting driver that drives the second lift. The second moving mechanism, the second travelling driver, the second transfer mechanism and the second lifting driver may each be arranged at the same position as the other-side end portion of the second mast or arranged on the one side from the other-side end portion in the extending direction of the travelling route.

With this configuration, there is no need to provide the power supply and the controller in the second stacker crane, thus enabling reduction in number of devices mounted in the second stacker crane. Further, the second moving mechanism, the second travelling driver, the second transfer mechanism and the second lifting driver which are mounted in the second stacker crane are each arranged at the same position as the other-side end portion of the second mast or arranged on the one side from the other-side end portion in the extending direction of the travelling route. In other words, the second moving mechanism, the second travelling driver, the second transfer mechanism and the second lifting driver are not arranged on the other side from the other-side end portion of the second mast in the extending direction of the travelling route. This leads to a reduction in an area in which the device protrudes to the other side from the other-side end portion of the second mast. As a result, it is possible to reduce a dead space that is generated in association with this area. Further, with this configuration, each of the power supply and the controller is arranged at the position deviated from the extended line of the travelling route, thus eliminating the need to provide an area for arranging each of the power supply and the controller in a direction along the extending direction of the travelling route. As a result, it is possible to reduce a dead space that is generated in association with this area.

In in-and-out part, a length of each of the first moving mechanism and the second moving mechanism in the extending direction of the travelling route may be one-half or less of a length of the shelf in the extending direction of the travelling route.

With this configuration, two stacker cranes can simultaneously take the articles on and out of a plurality of shelves arrayed in the vertical direction at the same position in the extending direction of the travelling route.

An operating method for the automated warehouse according to another preferred embodiment of the present invention may include a first step of arranging the first transfer and the second transfer mechanism at mutually different positions in the vertical direction; and a second step of arranging the first stacker crane and the second stacker crane after the first step such that the first transfer mechanism and the second transfer mechanism face the shelves at the same position in a direction intersecting with the extending direction and the vertical direction of the travelling route.

In this operating method for the automated warehouse, it is possible to transfer the articles to and from two shelves at the same position in the direction intersecting with the extending direction and the vertical direction of the travelling route, namely in a horizontal direction. Hence it is possible to rapidly carry a plurality of articles.

An operating method for the automated warehouse according to a further preferred embodiment of the present invention may include a first step of arranging the first stacker crane at one end of the travelling route when the first stacker crane is broken down; and a second step of making the second stacker crane carry the article.

In the automated warehouse including the two stacker cranes, it is considered that, when one stacker crane is broken down, the one stacker crane blocks the shelf, to prevent the other stacker crane from transferring the article. Further, it is considered that the one stacker crane blocks the travelling route, to also prevent the other stacker crane from transferring the article to and from the shelves around the shelf blocked by the one stacker crane. In the operating method for the automated warehouse according to a further preferred embodiment of the present invention, the first stacker crane is arranged such that the first transfer mechanism faces the shelf at the one-side end in the extending direction of the travelling route, and there is thus generated no shelf to and from which the second stacker crane cannot carry the article. Accordingly, it is possible to continue to carry the article by the second stacker crane, while holding small the number of shelves to and from which the second stacker crane cannot transfer the articles due to the first stacker crane being an obstacle.

In the second step of the operating method for the automated warehouse according to a further preferred embodiment of the present invention, restraint of the first lift to the first mast may be released in the first stacker crane.

According to this operating method for the automated warehouse, when the article is to be transferred to or from the shelf, to and from which the second transfer mechanism cannot transfer the article due to the first stacker crane being an obstacle, it is possible to transfer the article by moving the first lift.

According to various preferred embodiments of the present invention, it is possible to reduce a dead space.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
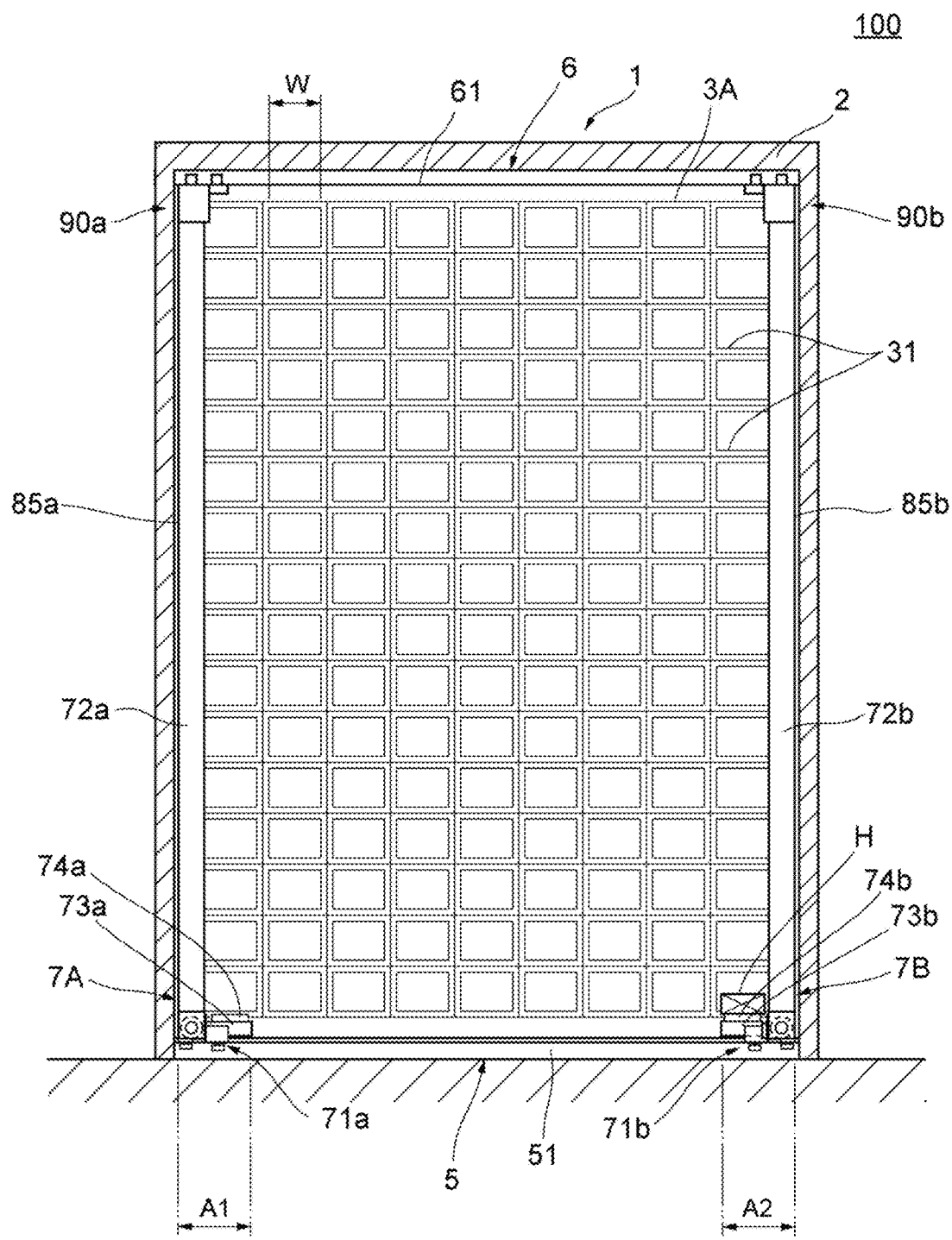
FIG. 1 is a side sectional view of an automated warehouse according to preferred embodiment of the present invention.

In the following, preferred embodiments of the present invention will be described with reference to the drawings. It is to be noted that the same numeral is provided to the same element or a corresponding element, and a repeated description will be omitted. A size ratio of the drawing is not necessarily consistent with that in the description.

Figure 2:
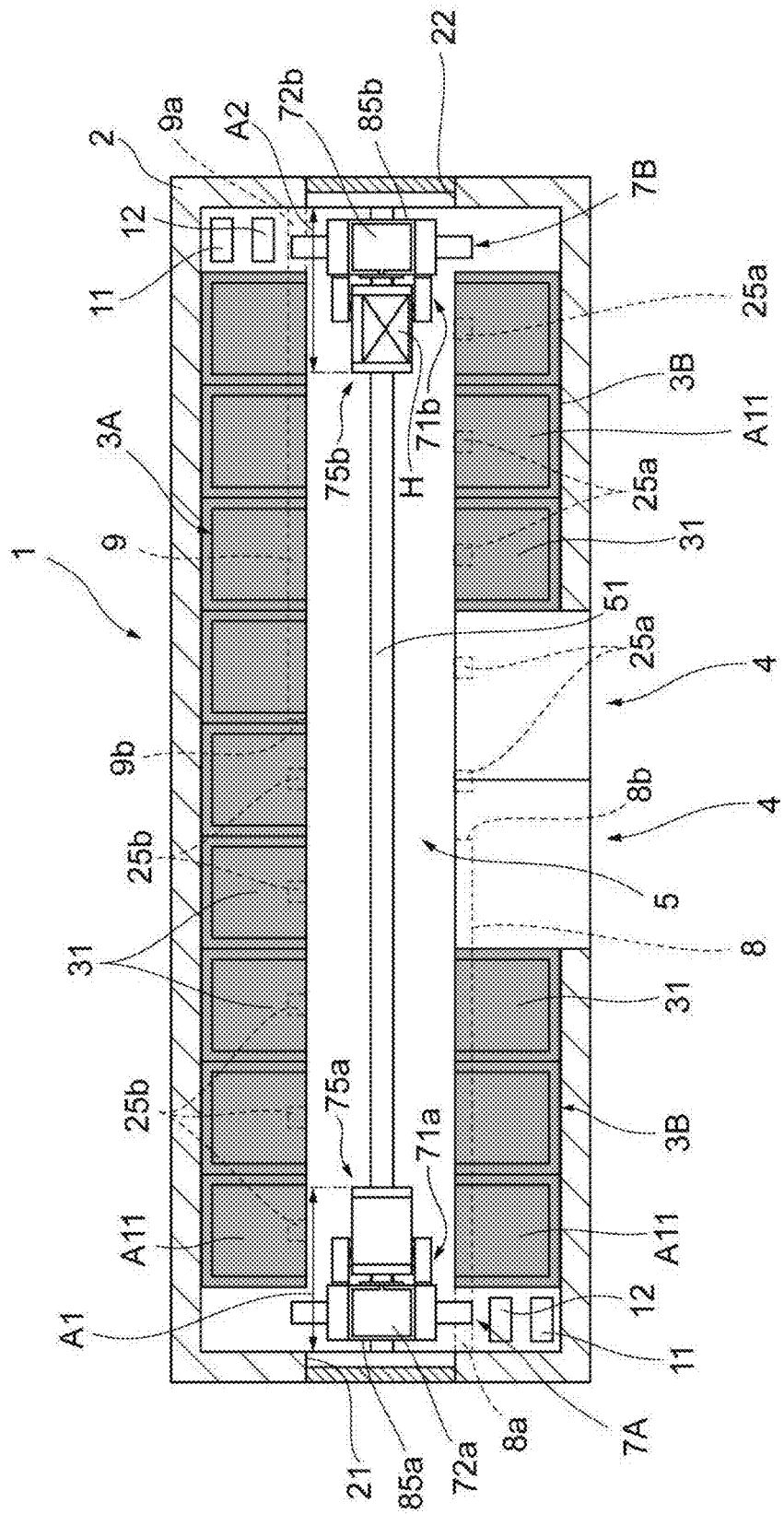
FIG. 2 is a plan view of the automated warehouse of FIG. 1.

As illustrated in FIGS. 1 and 2, an automated warehouse 1 is provided in a building 100. In the automated warehouse 1, for example, an article H having been carried by a conveyer is stored.

The automated warehouse 1 is provided with a stocker body 2, racks 3A, 3B, reception and shipment ports 4, 4, a travelling route 5, an auxiliary route 6, a stacker crane (a first stacker crane) 7A and a stacker crane (a second stacker crane) 7B.

The stocker body 2 preferably is configured as a casing surrounding a predetermined space (e.g., a hollow rectangular parallelepiped shape). The stocker body 2 includes a first opening 21 and a second opening 22, through which the stacker crane 7A and the stacker crane 7B can be taken out of the stocker body 2. The first opening 21 and the second opening 22 face each other in the extending direction of the travelling route 5 (a horizontal direction). Each of the first opening 21 and the second opening 22 is provided with a door. It is to be noted that the first opening 21 and the second opening 22 may not be provided in the stocker body 2.

Each of the racks 3A, 3B is vertically provided in the stocker body 2. The rack 3A and the rack 3B are arranged along the travelling route 5 as described in detail later. Further, the rack 3A and the rack 3B are arranged so as to face each other in a width direction perpendicular or substantially perpendicular to the extending direction and the vertical direction of the travelling route 5. The rack 3A is provided along a side wall on one side (the upper side in FIG. 2) out of two side walls facing each other in the stocker body 2. On the side wall on the one side, the rack 3A is provided in a portion except for both end portions in the extending direction of the travelling route 5. The rack 3B is provided along a side wall on the other side out of the two side walls facing each other in the stocker body 2. On the side wall on the other side (the lower side in FIG. 2), the rack 3B is provided in a portion except for both end portions in the extending direction of the travelling route 5. The side wall on the other side is provided with the reception and shipment ports 4, 4 in almost a central portion in the extending direction of the travelling route 5, and the reception and shipment ports 4, 4 are provided in a portion of the rack 3B. In the reception and shipment ports 4, 4, the article H is received in or shipped from the automated warehouse 1.

Each of the racks 3A, 3B is provided with a plurality of shelves 31 on which the articles H are stored. In the following, a description will be given by taking an array of the shelves 31 in a width direction of the stocker body 2 (the extending direction of the travelling route 5, a lateral direction of FIG. 2) as a "bay", taking an array of the shelves 31 in a depth direction of the stocker body 2 (a perpendicular direction of FIG. 2) as a "column", and taking an array of a height direction of the stocker body 2 (a perpendicular direction of FIG. 1) as a "level".

Figure 8:
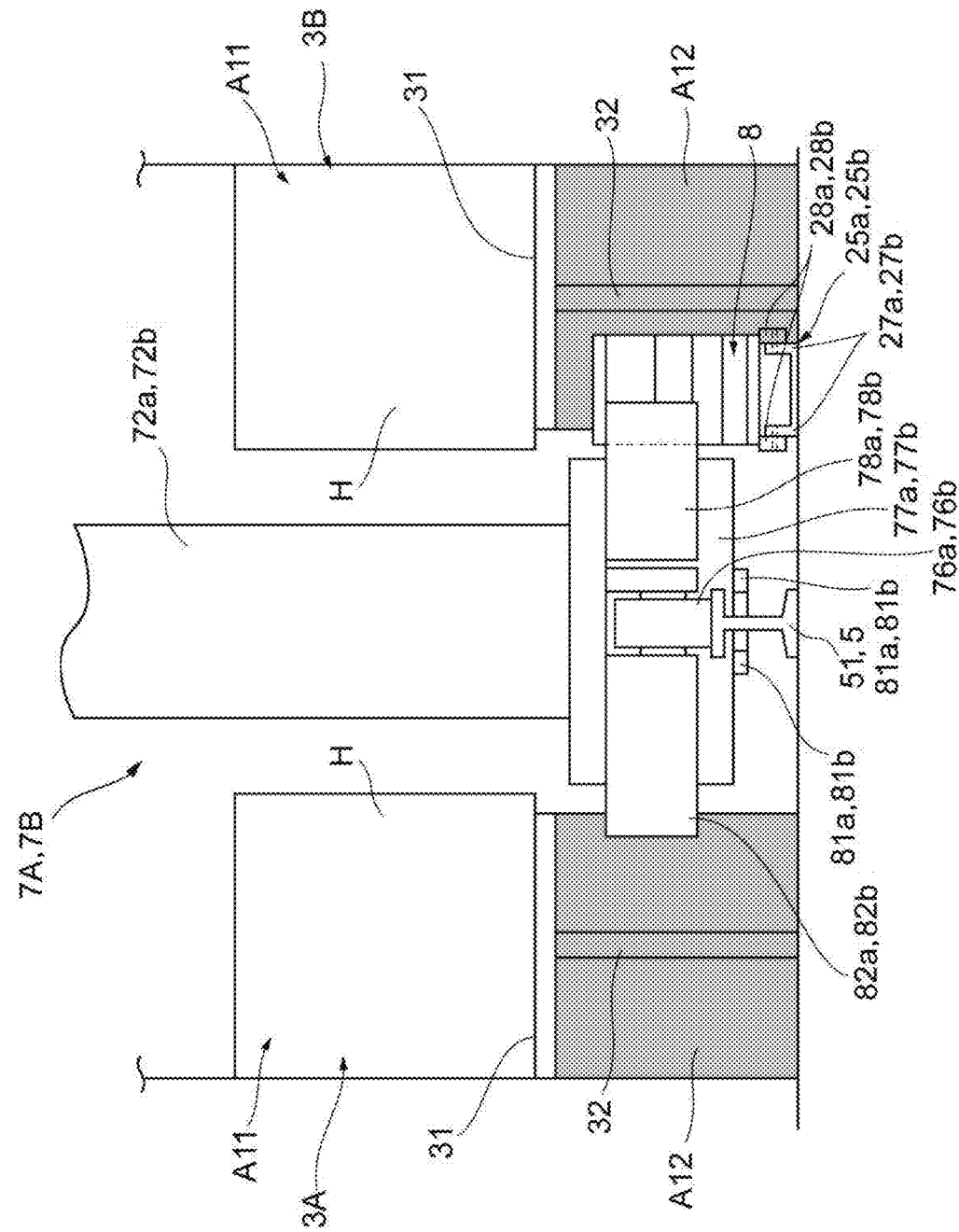
FIG. 8 is a front view illustrating a configuration of a cable guide of FIG. 2.

The shelves 31 are provided on a plurality of bays along the extending direction of the travelling route 5, and are also provided on a plurality of levels along the vertical direction. A length W of the shelf 31 in the extending direction of the travelling route 5 is appropriately set in accordance with a size of a stored item. As illustrated in FIG. 8, each of the racks 3A, 3B is supported by a prop 32. The prop 32 is arranged at a position not in contact with a travelling motor (a first travelling driver) 78a and a lifting motor (a first lifting driver) 82a as described in detail later, at the time of travelling of the stacker crane 7A and the stacker crane 7B.

As illustrated in FIGS. 1 and 2, each of the travelling route 5 and the auxiliary route 6 is provided across between the first opening 21 and the second opening 22 in the stocker body 2. The travelling route 5 is provided on a floor along the shelves 31 on the plurality of bays. A travelling rail 51 is laid on the travelling route 5. The auxiliary route 6 is provided substantially immediately above the travelling route 5 along the shelves 31 on the plurality of bays, so as to face the travelling route 5. An auxiliary rail 61 is laid on the auxiliary route 6.

Each of the stacker crane 7A and the stacker crane 7B travels along the travelling rail 51 laid on the travelling route 5, to carry the article H between the shelf 31 and the reception and shipment ports 4, 4 and transfer the article H to and from (load and unload the article H on) the shelf 31.

With respect to the stacker crane 7A, the stacker crane 7B is arranged on the other side in the extending direction of the travelling route 5 and the auxiliary route 6 (the right side in FIGS. 1 and 2, and the second opening 22 side with respect to the stacker crane 7A).

The inside of the stocker body 2 is provided with an area A1 in which the stacker crane 7A is arranged at the time of transferring the article H to or from the shelf 31 on a bay of the one-side end in the extending direction of the travelling route 5. In the area A1, a slider (a first in-and-out moving mechanism) 74a of the stacker crane 7A faces the shelf 31 on the bay of the one-side end in the extending direction of the travelling route 5. The area A1 includes an area for allowing a mast (first mast) 72a of the stacker crane 7A to escape.

The inside of the stocker body 2 is provided with an area A2 in which the stacker crane 7B is arranged when the stacker crane 7B transfers the article H to or from the shelf 31 on a bay of the other-side end in the extending direction of the travelling route 5. In the area A2, a slider (a second in-and-out moving mechanism) 74b of the stacker crane 7B faces the shelf 31 on the bay of the other-side end in the extending direction of the travelling route 5. The area A2 includes an area for allowing a mast (second mast) 72b of the stacker crane 7B to escape.

Figure 3:
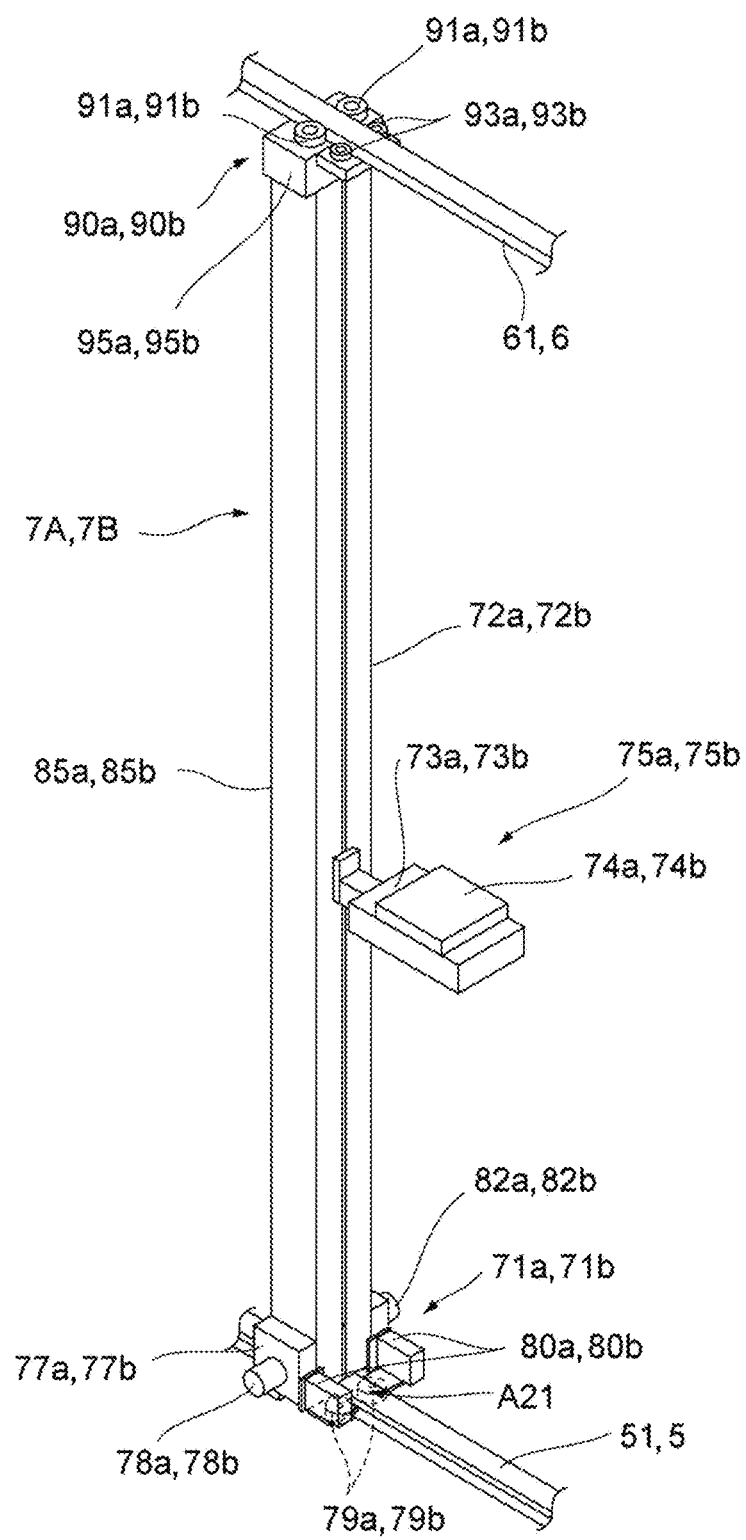
FIG. 3 is a perspective view of the stacker crane of FIG. 1.

As illustrated in FIG. 3, the stacker crane 7A includes the mast 72a, a transfer mechanism (a first transfer mechanism) 75a, a moving mechanism (a first moving mechanism) 71a, the travelling motor 78a, the lifting motor 82a, and an auxiliary moving mechanism 90a.

The mast 72a is vertically provided in the vertical direction above the moving mechanism 71a as described in detail later. The transfer mechanism 75a includes a lift stage (a first lift) 73a and a slider 74a. The lift stage 73a is arranged so as to project to the other side with respect to the mast 72a in the extending direction of the travelling route 5, and provided liftably along the mast 72a. The slider 74a is provided on the upper portion of the lift stage 73a. The slider 74a transfers the article H to and from the shelf 31, and also transfers the article H to and from the reception and shipment ports 4, 4.

Figure 4:
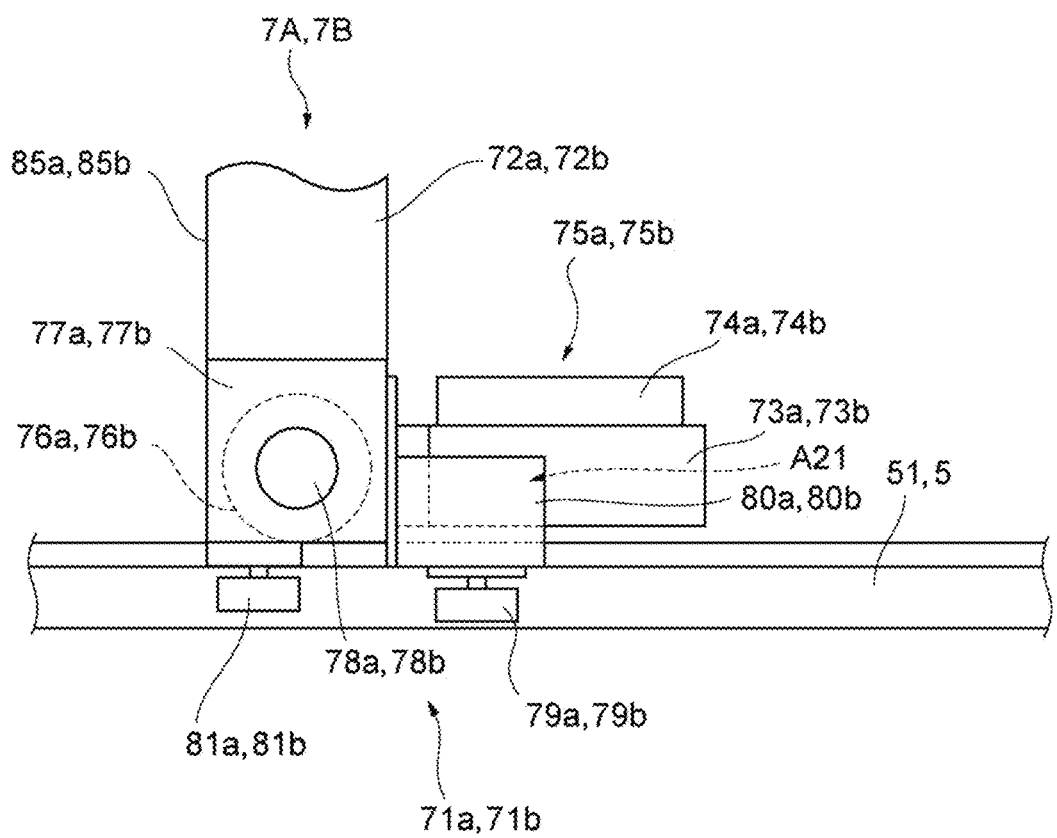
FIG. 4 is a front view of a lower portion of the stacker crane of FIG. 3.
Figure 5:
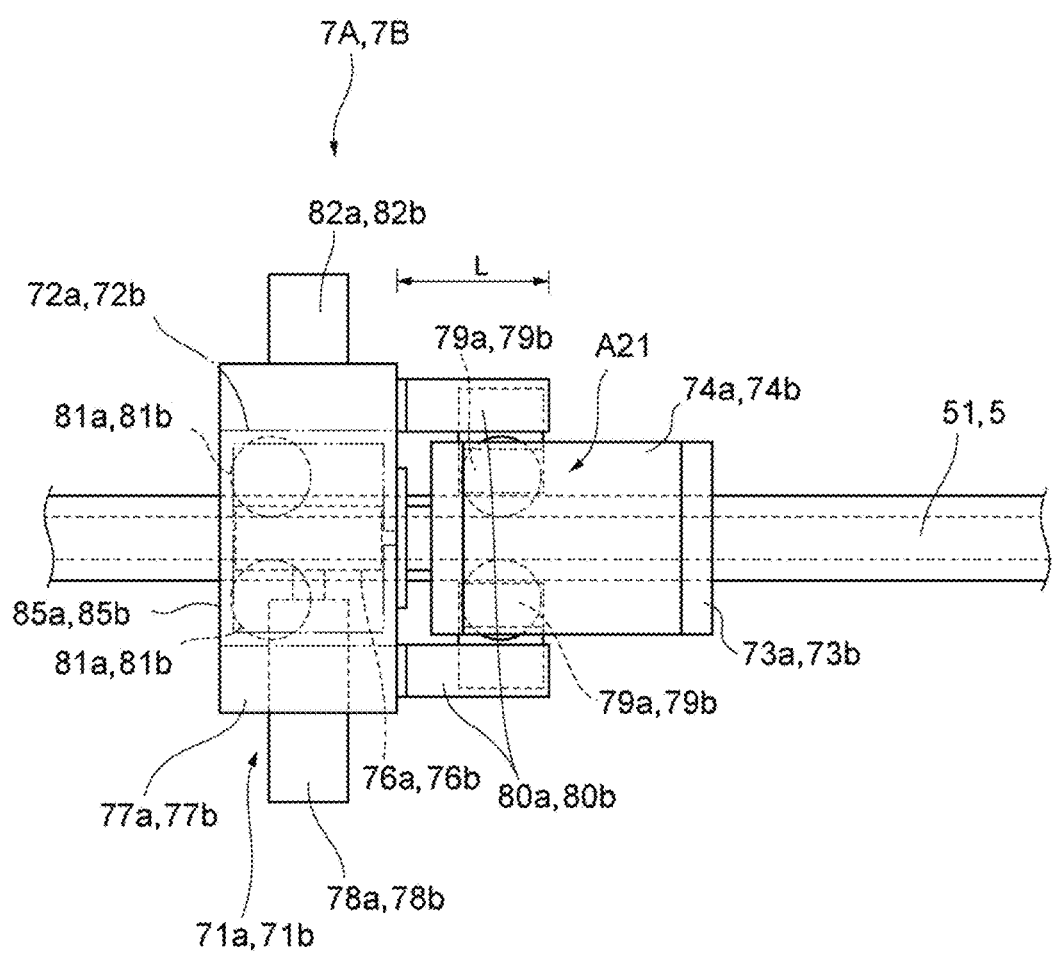
FIG. 5 is a plan view of a lower portion of the stacker crane of FIG. 3.

The moving mechanism 71a travels along the travelling route 5. As illustrated in FIGS. 4 and 5, the moving mechanism 71a includes a travelling driving wheel (a first driving wheel) 76a, a housing 77a, a pair of lift-stage-side travelling guiding wheels (first guiding wheels) 79a, 79a, a pair of supports (first supports) 80a, 80a, and a pair of mast-side travelling guiding wheels 81a, 81a.

The travelling driving wheel 76a moves by rolling along the upper surface of the travelling rail 51. The travelling driving wheel 76a is arranged so as to overlap with the mast 72a when viewed from the vertical direction. The housing 77a rotatably supports the travelling driving wheel 76a. The housing 77a is fixed to a lower end portion of the mast 72a.

The lift-stage-side travelling guiding wheel 79a moves by rolling along the side surface of the travelling rail 51. The lift-stage-side travelling guiding wheel 79a is arranged on the other side with respect to the travelling driving wheel 76a in the extending direction of the travelling route 5. The pair of lift-stage-side travelling guiding wheels 79a, 79a is arranged with the travelling rail 51 located therebetween in the direction (the width direction) perpendicular or substantially perpendicular to the extending direction and the vertical direction of the travelling route 5.

The pair of supports 80a, 80a rotatably supports the pair of lift-stage-side travelling guiding wheels 79a, 79a. The pair of supports 80a, 80a is arranged on the other side with respect to the travelling driving wheel 76a in the extending direction of the travelling route 5. As illustrated in FIGS. 3 to 5, a space A21 which the lift stage 73a can enter from the vertical direction is provided between the pair of supports 80a, 80a in the width direction.

Each portion of the pair of supports 80a, 80a includes a member projecting from the housing 77a and a member projecting from the lower surface of the above member to rotatably support the lift-stage-side travelling guiding wheel 79a. As illustrated in FIG. 5, a length L of the member projecting from the housing 77a in the extending direction of the travelling route 5 is preferably about one-half or less of the length W of the shelf 31 in the extending direction of the travelling route 5 (L≤W/2).

The mast-side travelling guiding wheels 81a, 81a move by rolling along the side surfaces of the travelling rail 51. The mast-side travelling guiding wheels 81a, 81a are arranged so as to overlap with the mast 72a when viewed from the vertical direction. The pair of mast-side travelling guiding wheels 81a, 81a is arranged with the travelling rail 51 located therebetween in the width direction. The mast-side travelling guiding wheels 81a, 81a are rotatably fitted to the lower portion of the housing 77a.

Figure 6:
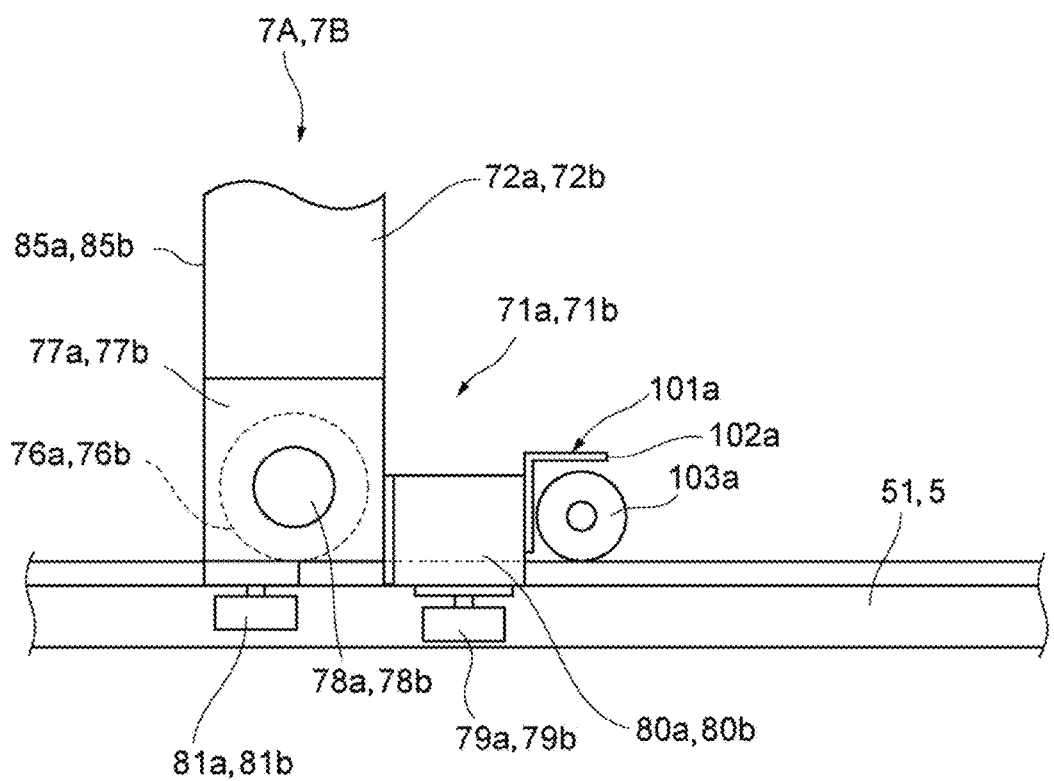
FIG. 6 is a front view of a lower portion of the stacker crane mounted with a coupled driving wheel unit.

As illustrated in FIG. 6, when the stacker crane 7A is to be installed to the travelling rail 51, a coupled driving wheel unit 101a may be fitted to the moving mechanism 71a in order to substantially vertically raise the mast 72a. The coupled driving wheel unit 101a includes an auxiliary member 102a provided across the leading end portions of the pair of supports 80a, 80a projecting from the housing 77a, and a coupled driving wheel 103a fixed to this auxiliary member 102a and rotatably movable along the upper surface of the travelling rail 51. At the time of travelling of the stacker crane 7A, by driving the travelling driving wheel 76a and auxiliary driving wheels 91a, 91a in synchronization, the mast 72a is able to be held in the vertically or substantially vertically rising state. This eliminates the need for the coupled driving wheel unit 101a to come into contact with the travelling rail 51 after the stacker crane 7A has been installed to the travelling rail 51. Accordingly, after the stacker crane 7A has been installed to the travelling rail 51, the coupled driving wheel unit 101a may be removed from the moving mechanism 71a, or the coupled driving wheel 103a may be slid upward to provide a clearance between the coupled driving wheel 103a and the travelling rail 51.

The travelling motor 78a is a driving source of the travelling driving wheel 76a. As illustrated in FIGS. 2 and 8, the travelling motor 78a is fixed to the housing 77a so as to project to the rack 3B side. Below the shelve 31 on the lowest level of the rack 3B, the travelling motor 78a is arranged so as to project to a position overlapping with a storage area A11 in which the article is stored on the shelf 31 when viewed from the vertical direction. In other words, at the time of travelling of the stacker crane 7A, the travelling motor 78a moves in the space A12 below the shelves 31 on the lowest level of the rack 3B.

The lifting motor 82a is a driving source of the lift stage 73a. The lifting motor 82a is fixed to the housing 77a so as to project to the rack 3A side. Below the shelve 31 on the lowest level of the rack 3A, the lifting motor 82a is arranged so as to project to a position overlapping with the storage area A11 in which the article is stored on the shelf 31 when viewed from the vertical direction. In other words, at the time of travelling of the stacker crane 7A, the lifting motor 82a moves in the space A12 below the shelves 31 on the lowest level of the rack 3B.

Figure 7:
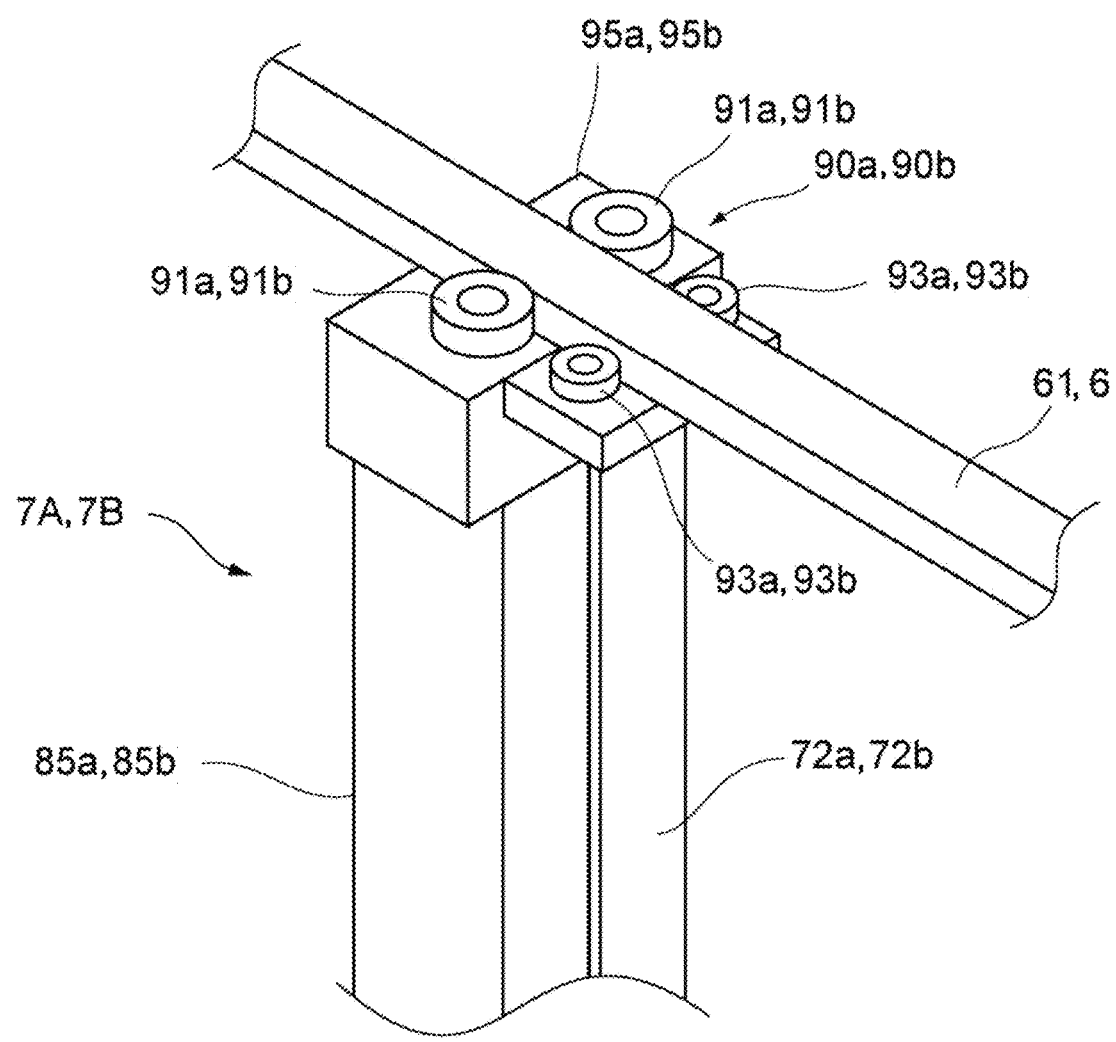
FIG. 7 is a perspective view of an upper portion of the stacker crane of FIG. 3.

As illustrated in FIG. 7, the auxiliary moving mechanism 90a travels along the auxiliary route 6. The auxiliary moving mechanism 90a includes a pair of auxiliary driving wheels (first auxiliary driving wheels) 91a, 91a, a pair of auxiliary guiding wheels 93a, 93a, and a housing 95a.

The auxiliary driving wheels 91a, 91a move by rolling along the auxiliary rail 61. The pair of auxiliary driving wheels 91a, 91a is arranged with the auxiliary rail 61 located therebetween in the direction (the width direction) perpendicular or substantially perpendicular to the extending direction and the vertical direction of the auxiliary route 6. The auxiliary guiding wheels 93a, 93a move by rolling along the auxiliary rail 61. The pair of auxiliary guiding wheels 93a, 93a is arranged with the auxiliary rail 61 located therebetween in the width direction. The housing 95a is fixed to an upper end portion of the mast 72a. The housing 95a is fitted with a member that rotatably supports the auxiliary driving wheels 91a, 91a and the auxiliary guiding wheels 93a, 93a. The housing 95a is fitted with an auxiliary motor (not illustrated) as a driving source of the auxiliary driving wheels 91a, 91a.

In the stacker crane 7A, by driving the travelling driving wheel 76a and the auxiliary driving wheels 91a, 91a in synchronization, a posture of the mast 72a is stabilized such that the mast 72a is vertically or substantially vertically held even when the foregoing coupled driving wheel unit 101a is removed.

As illustrated in FIGS. 2 and 3, in the stacker crane 7A, the moving mechanism 71a, the travelling motor 78a, the transfer mechanism 75a and the lifting motor 82a are arranged on the other side (the second opening 22 side) from the one-side (first opening 21-side) end portion 85a of the mast 72a in the extending direction of the travelling route 5.

As illustrated in FIGS. 1 and 2, out of the plurality of shelves 31, the shelf 31 arranged at the one-side (first opening 21-side) end along the extending direction of the travelling route 5 is arranged at a position, on and out of which the article H is able to be taken by the stacker crane 7A that stops at the one end of the travelling route 5 (the area A1).

The stacker crane 7B has a similar configuration to that of the stacker crane 7A, and includes a moving mechanism (a second moving mechanism) 71b, a mast (a second mast) 72b, a transfer mechanism (a second transfer mechanism) 75b, an auxiliary moving mechanism 90b, a travelling motor (a second travelling driver) 78b, and a lifting motor (a second lifting driver) 82b.

The transfer mechanism 75b includes a lift stage (a second lift) 73b and a slider 74b. The moving mechanism 71b has a similar configuration to that of the moving mechanism 71a, and includes a travelling driving wheel (a second driving wheel) 76b, a housing 77b, a pair of lift-stage-side travelling guiding wheels 79b, 79b, a pair of supports (second supports) 80b, 80b, and a pair of mast-side travelling guiding wheels 81b, 81b. The auxiliary moving mechanism 90b has a similar configuration to that of the auxiliary moving mechanism 90a, and includes a pair of auxiliary driving wheels 91b, 91b, a pair of auxiliary guiding wheels 93b, 93b, and a housing 95b.

As illustrated in FIGS. 2 and 3, similarly to the stacker crane 7A, in the stacker crane 7B, the moving mechanism 71b, the travelling motor 78b, the transfer mechanism 75b and the lifting motor 82b are arranged on the one side (the first opening 21 side) from the other-side (second opening 22-side) end portion 85b of the mast 72b in the extending direction of the travelling route 5.

As illustrated in FIGS. 1 and 2, out of the plurality of shelves 31, the shelf 31 arranged at the other-side (second opening 22-side) end along the extending direction of the travelling route 5 is arranged at a position, on and out of which the article H is able to be taken by the stacker crane 7B that stops at the other end of the travelling route 5 (the area A2).

The stacker crane 7A is connected with a flexible cable guide (a first cable) 8. The stacker crane 7B is connected with a flexible cable guide (a second cable) 9. The cable guides 8, 9 connect a power supply 11 and a controller 12, which are installed in the automated warehouse 1, with the stacker cranes 7A, 7B. That is, the stacker cranes 7A, 7B are supplied with electric power from the power supply 11 via the cable guides 8, 9, and exchange control signals to and from the controller 12 via the cable guides 8, 9. The cable guide 8(9) connected to the stacker crane 7A(7B) is also arranged on the other (one) side from the one-side (other-side) end portion 85a(85b) of the mast 72a(72b) in the extending direction of the travelling route 5.

The controller 12 preferably includes a servo amplifier, a motion controller, a programmable controller, and the like, which is configured or programmed to provide a command generator and/or a controller for each motor (the travelling motor 78a, the lifting motor 82a, a driving motor (not illustrated) for the slider 74a, and an auxiliary motor (not illustrated)) in the stacker crane 7A. These are connected with each motor of the stacker crane 7A through the cable guide 8. Further, the controller 12 preferably includes a servo amplifier, a motion controller, a programmable controller, and the like, which is configured or programmed to provide a command generator and/or a controller for each motor (the travelling motor 78b, the lifting motor 82b, a driving motor (not illustrated) for the slider 74b, and an auxiliary motor (not illustrated)) in the stacker crane 7B.

The power supply 11 and the controller 12 are arranged in a space at each of four corners of the automated warehouse 1. The space at each of the four corners of the automated warehouse 1 is a space, in and out of which each of the stacker cranes 7A, 7B cannot take the article H, and is not installed with the shelf 31 for storing the article H.

Figure 9:
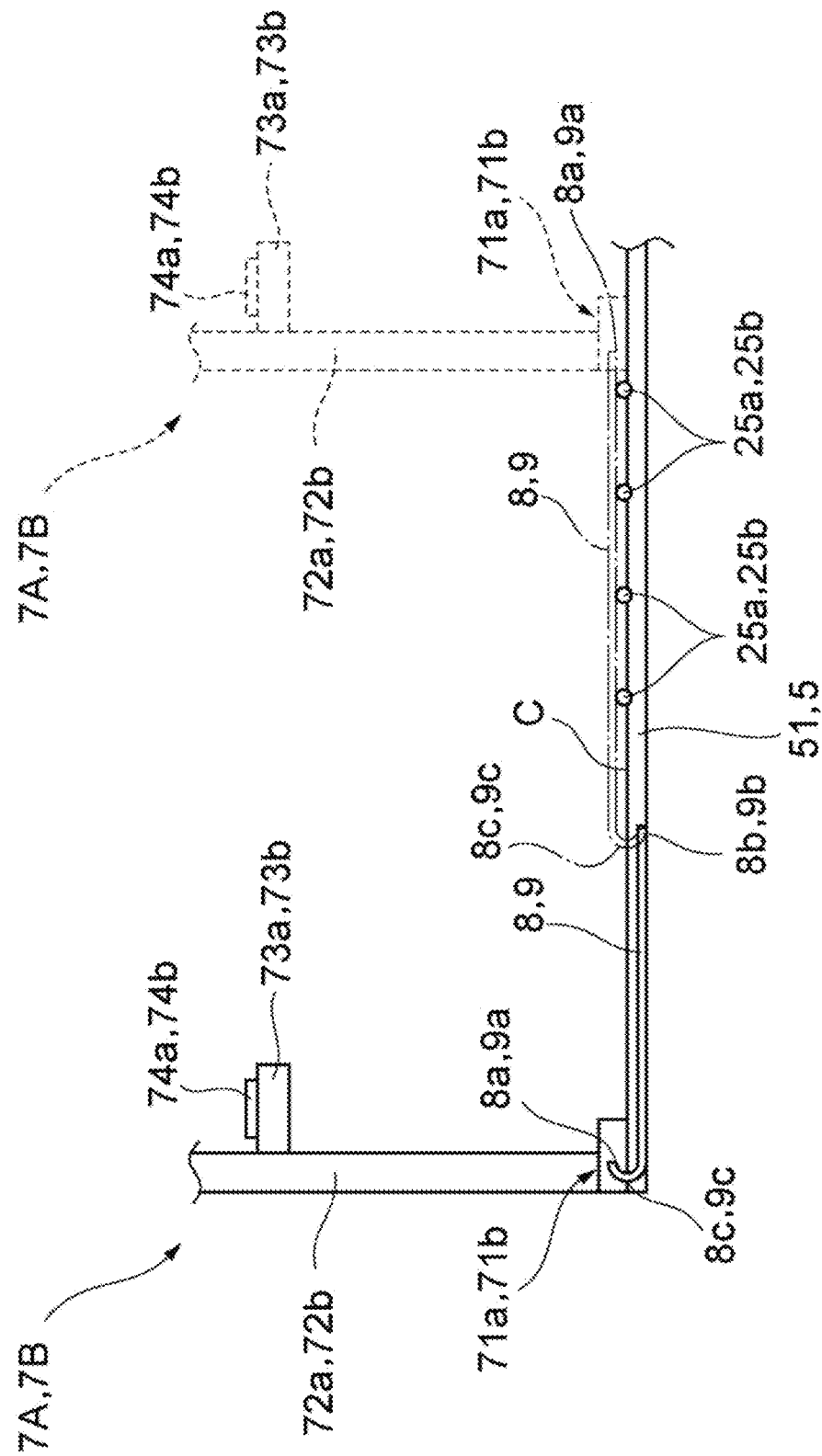
FIG. 9 is a side view of the stacker crane of FIG. 1.

As illustrated in FIGS. 2 and 9, the cable guide 8 is arranged on the one side (the rack 3B side) lateral to the travelling rail 51, and the cable guide 9 is arranged on the other side (the rack 3A side) lateral to the travelling rail 51. The cable guide 8 is arranged so as to use the space A12 (see FIG. 8) below the shelves 31 in the lowest portion of the rack 3B, and the cable guide 9 is arranged so as to use the space A12 (see FIG. 8) below the shelves 31 in the lowest portion of the rack 3A.

The cable guide 8(9) includes a U-shaped portion 8c(9c) folded back in a U-shape between a base end portion 8b(9b) and a leading end portion 8a(9a). The base end portion 8b(9b) of the cable guide 8(9) is arranged symmetrically about a rail center C. The position of the U-shaped portion 8c(9c) varies depending on a travelling position of the stacker crane 7A(7B). The rail center C is a center position in a length range in which the travelling rail 51 extends.

At the time of travelling of the stacker crane 7A from the rail center C to the one side (the first opening 21 side) in the extending direction of the travelling route 5, the cable guide 8 is folded back at the U-shaped portion 8c from the state of being in contact with the floor of the automated warehouse 1. Further, at the time of travelling of the stacker crane 7A from the rail center C to the other side (the second opening 22 side) in the extending direction of the travelling route 5, the cable guide 8 is folded back in a U-shape in the vicinity of the base end portion 8b and extended to the leading end portion 8a while being floated from the floor of the automated warehouse 1.

Similarly, at the time of travelling of the stacker crane 7B from the rail center C to the other side (the second opening 22 side) in the extending direction of the travelling route 5, the cable guide 9 is folded back at the U-shaped portion 9c from the state of being in contact with the floor of the automated warehouse 1. Further, at the time of travelling of the stacker crane 7B from the rail center C to the one side (the first opening 21 side) in the extending direction of the travelling route 5, the cable guide 9 is folded back in a U-shape in the vicinity of the base end portion 9b and extended to the leading end portion 9a while being floated from the floor of the automated warehouse 1.

Lateral to the travelling rail 51 from the vicinity of the base end portion 8b(9b) to the other side (the one side) in the extending direction of the travelling route 5, supporting members 25a(25b) are provided at regular intervals along the travelling rail 51. The supporting members 25a(25b) support a lower portion of the cable guide 8(9). In the supporting member 25a(25b), for example, a pair of right and left rollers 28a, 28a (28b, 28b) is rotatably supported by two lateral sides 27a(27b) of a C-shaped bracket. The rollers 28a, 28a (28b, 28b) support the vicinities of both the right and left ends of the cable guide 8(9) from below.

The supporting member 25a(25b) with such a configuration prevents the cable guide 8(9) from drooping and scraping against the floor of the automated warehouse 1, to reduce emission of dust and damage to the cable guide 8(9).

As illustrated in FIGS. 1 and 2, in the stacker crane 7A, the lift stage 73a projects to the other side (the stacker crane 7B side) with respect to the mast 72a in the extending direction of the travelling route 5. In the stacker crane 7B, the lift stage 73b projects to the one side (the stacker crane 7A side) with respect to the mast 72b in the extending direction of the travelling route 5. With such a configuration, the slider 74a of the stacker crane 7A and the slider 74b of the stacker crane 7B are arranged at mutually different positions in the vertical direction, and hence they are able to respectively face the shelves 31, 31 at the same position (the same bay) in the extending direction of the travelling route 5.

In the automated warehouse 1 as thus described, the stacker crane 7A and the stacker crane 7B travel along the travelling route 5 to carry the articles H between the shelves 31 and the reception and shipment ports 4, 4, and transfer the articles H to and from the shelves 31 and the reception and shipment ports 4, 4.

At this time, when the articles H are to be transferred to the two shelves 31, 31 at the same position (on the same bay) in the extending direction of the travelling route 5, first, the slider 74a of the stacker crane 7A and the slider 74b of the stacker crane 7B are arranged at mutually different positions in the vertical direction. Subsequently, the stacker crane 7A and the stacker crane 7B are arranged such that the slider 74a of the stacker crane 7A and the slider 74b of the stacker crane 7B respectively face the shelves 31, 31 at the same position in the extending direction of the travelling route 5.

Subsequently, the stacker crane 7A and the stacker crane 7B are respectively made to transfer the articles H to the facing shelves 31. It is to be noted that either the stacker crane 7A or the stacker crane 7B may be made to transfer the article H.

Figure 10:
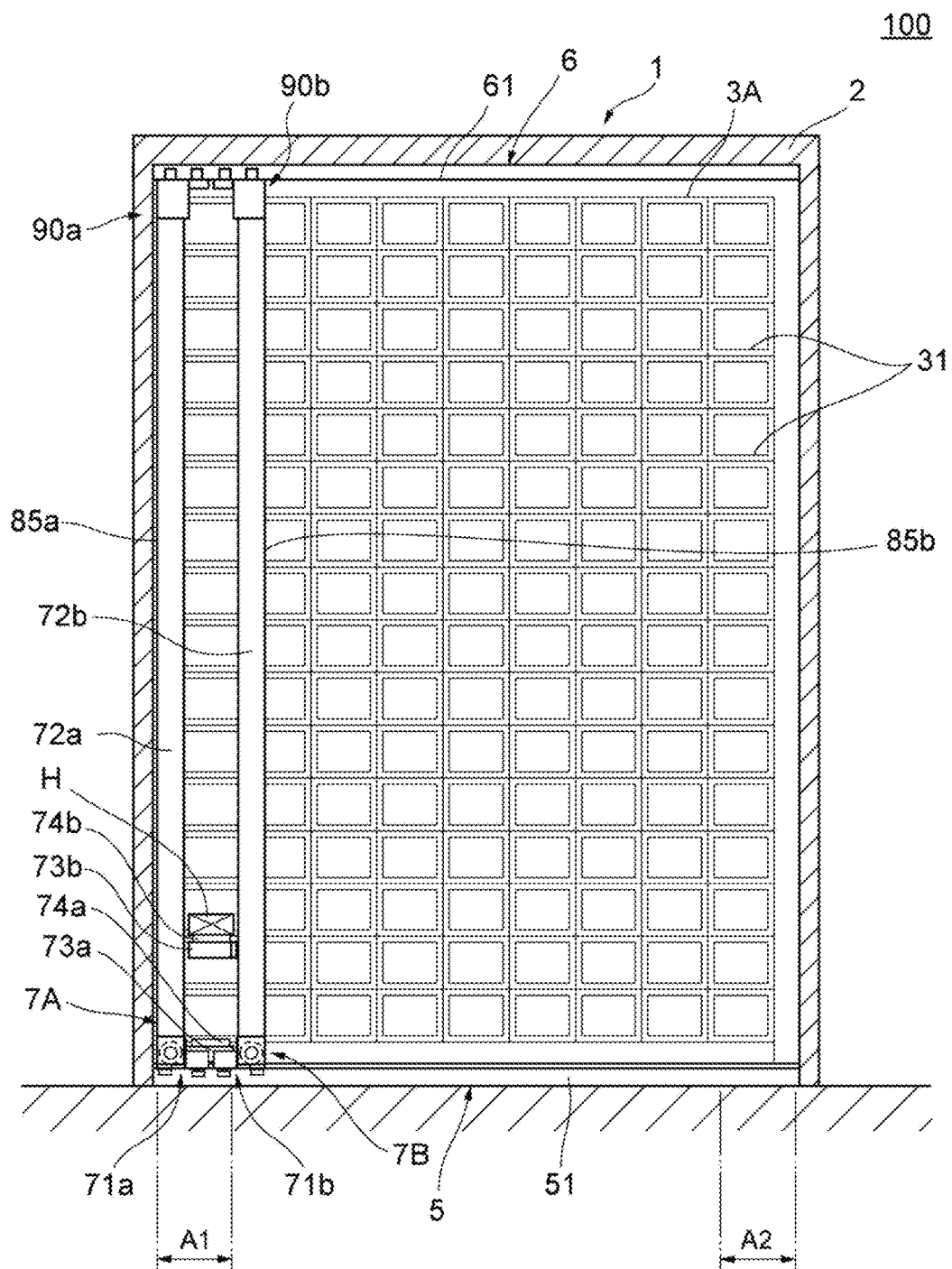
FIG. 10 is a side view illustrating one example of an operating method for the automated warehouse of FIG. 1.
Figure 11:
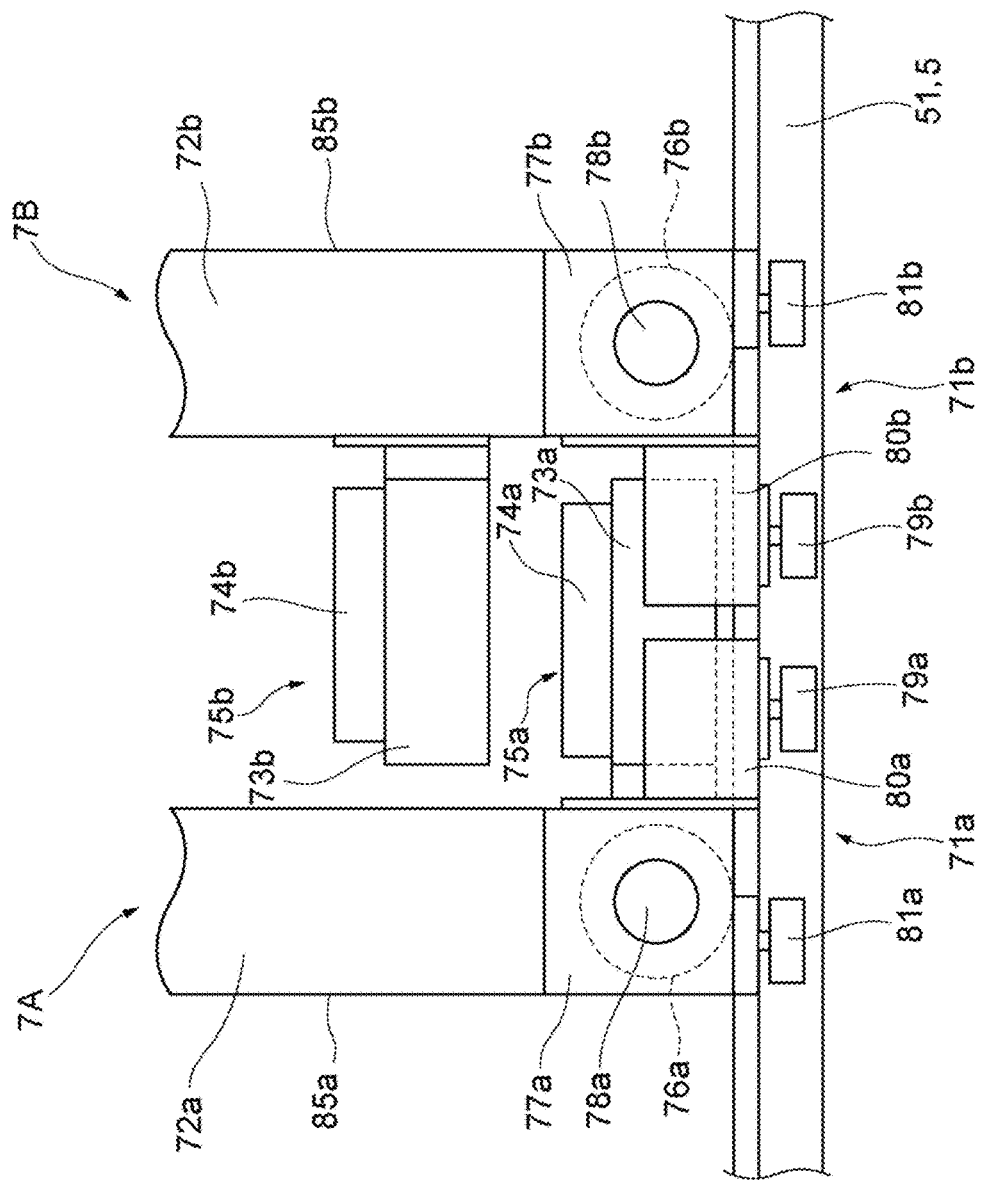
FIG. 11 is a front view illustrating two stacker cranes in the operating method for the automated warehouse illustrated in FIG. 10.

Further, for example when the stacker crane 7A is broken down, the article H continues to be carried by the stacker crane 7B. In this case, as illustrated in FIGS. 10 and 11, first, the stacker crane 7A is arranged in the area A1. At this time, in the stacker crane 7A, restraint of the lift stage 73a to the mast 72a is released, to arrange the lift stage 73a at the lowest position. In this state, the shelves 31 which the slider 74b of the stacker crane 7B cannot face (namely, the shelves 31 to and from which the stacker crane 7B cannot transfer the article H) are three shelves 31: the shelf 31 on the lowest level and a bay of the one-side end in the extending direction of the travelling route 5; the shelf 31 on a level one above the lowest level; and the shelf 31 on the lowest level and the next bay to the bay of the one-side end. Subsequently, the stacker crane 7B is made to carry the article H. It is to be noted that the stacker crane 7A may be retracted by driving force from the driving source, or by manual force of the operator.

When the article H is to be transferred to the shelf 31 out of the shelves 31 on the bay of the one-side end in the extending direction of the travelling route 5 except for the shelf 31 on the lowest level and the shelf 31 on the level one above the lowest level, the slider 74b of the stacker crane 7B is arranged at a height of a desired shelf 31, and the stacker crane 7B is moved such that the slider 74b faces the desired shelf 31.

When the article H is to be transferred to or from any of the shelf 31 on the lowest level and the bay of the one-side end in the extending direction of the travelling route 5, the shelf 31 on the level one above the lowest level and the shelf 31 on the lowest level and the next bay to the bay of the other-side end, the operator is made to move the lift stage 73a of the stacker crane 7A to a position above the level one above the lowest level, and to move the stacker crane 7B such that the slider 74b faces the desired shelf 31.

When the stacker crane 7A retracted to the area A1 is to be repaired while the article H continues to be transferred by the stacker crane 7B, a fence or the like which covers the retracted stacker crane 7A and its periphery may be installed to ensure the safety of the operator. In this case, when the article H is to be carried by the stacker crane 7B, the stacker crane 7B is moved so as not to interfere with the fence. Also when the stacker crane 7B is broken, similarly to the above, it is possible to continue to carry the article H by the stacker crane 7A.

Next, an effect of the automated warehouse 1 of the present preferred embodiment will be described. In the automated warehouse 1 of the present preferred embodiment, there is no need to provide the power supply and the controller in the stacker crane 7A, thus enabling reduction in number of devices mounted in the stacker crane 7A. As illustrated in FIGS. 3 and 4, the moving mechanism 71a, the travelling motor 78a, the transfer mechanism 75a and the lifting motor 82a, which are mounted in the stacker crane 7A, are arranged on the other side from the one-side end portion 85a of the mast 72a in the extending direction of the travelling route 5, thus leading to reduction in area in which the device protrudes to the one side from the one-side end portion 85a of the mast 72a. As a result, it is possible to reduce a dead space that is generated in association with this area. Further, in the present preferred embodiment, each of the power supply 11 and the controller 12 is arranged at the position deviated from the extended line of the travelling route 5, thus eliminating the need to provide an area for arranging each of the power supply 11 and the controller 12 in the direction along the extending direction of the travelling route 5. As a result, it is possible to reduce a dead space that is generated in association with this area.

Also as for the stacker crane 7B, similarly to the stacker crane 7A, there is no need to provide the power supply and the controller in the stacker crane 7B, thus enabling reduction in number of devices mounted in the stacker crane 7B. The moving mechanism 71b, the travelling motor 78b, the transfer mechanism 75b and the lifting motor 82b, which are mounted in the stacker crane 7B, are arranged on the one side from the other-side end portion 85b of the mast 72b in the extending direction of the travelling route 5, thus leading to reduction in area in which the device protrudes to the other side from the other-side end portion 85b of the mast 72b. As a result, it is possible to reduce a dead space that is generated in association with this area.

In the automated warehouse 1 of the above preferred embodiment, the constituent elements to provide a command to and/or control of each motor of the stacker crane 7A (7B), such as the servo amplifier, the motion controller and the programmable controller, are arranged outside the stacker crane 7A (7B). For this reason, as the driving device provided on the stacker crane 7A (7B) side, only the motor is arranged. This results in reduction in number of devices mounted in the stacker crane 7A (B), to reduce a dead space in the stocker body 2 which is generated due to an increase in area of devices mounted in the stacker crane 7A (7B), and also contribute to reduction in weight of the stacker crane 7A (7B).

In the stacker crane 7A of the present preferred embodiment, the moving mechanism 71a, the travelling motor 78a, the lifting motor 82a and the cable guide 8 are provided below the storage area A11 in which the article H is stored on the shelf 31, thus enabling effective use of the space A12 below the shelves 31 on the lowest level of the rack 3A (3B) which often becomes a dead space.

In the automated warehouse 1 of the present preferred embodiment, as illustrated in FIGS. 3 and 4, when the stacker crane 7A stops at one end of the travelling route 5 and transfers the article H to the shelf 31 arranged at the one-side end along the extending direction of the travelling route 5, only the mast 72a protrudes from the shelf 31 to the one side in the extending direction of the travelling route 5. In other words, when only the area for allowing the mast 72a to escape is provided in the automated warehouse 1, it is possible to transfer the article to the shelf 31 arranged at the one-side end along the extending direction of the travelling route 5. Thus, when the article H is to be transferred to the shelf 31 at the one-side end in the extending direction of the travelling route 5, a portion of a region other than mast 72a which protrudes from the shelf 31 in the extending direction of the travelling route 5 is reduced, thus enabling reduction in area that becomes a dead space. A similar effect can also be obtained for the stacker crane 7B.

Further, in the automated warehouse 1 of the present preferred embodiment, the power supply 11 and the controller 12 are arranged in a space at each of the four corners of the automated warehouse 1 which becomes a dead space in and out of which the stacker cranes 7A, 7B cannot take the article H. It is thus possible to decrease an installation area of the automated warehouse 1 while reducing the area that becomes a dead space.

Further, in the automated warehouse 1 of the present preferred embodiment, as illustrated in FIGS. 2 and 3, at the time of travelling of the stacker crane 7A, below the shelf 31 at the lowest level, the travelling motor 78a and the lifting motor 82a are arranged so as to project to the positions overlapping with the storage area A11 in which the article H is stored on the shelf 31 when viewed from the vertical direction. That is, in the automated warehouse 1 of the present preferred embodiment, the area below the shelves 31 is used as a passage area for each of the travelling motor 78a and the lifting motor 82a at the time of movement of the stacker crane 7A. Accordingly, when the travelling motor 78a and the lifting motor 82a are to be arranged on the other side from the one-side end portion 85a of the mast 72a, it is possible to reduce a quantity of projection to the other side from the one-side end portion 85a of the mast 72a. A similar effect can also be obtained for the stacker crane 7B.

Moreover, in the automated warehouse 1 of the present preferred embodiment, as illustrated in FIGS. 3 to 5, the space A21 which the lift stage 73a is able to enter from the vertical direction is provided between the pair of supports 80a, 80a in the width direction. With this configuration, the lift stage 73a is able to enter, from the vertical direction, the space A21 which is provided between the pair of supports 80a, 80a in the width direction, thus to allow lowering of the lift stage 73a to a relatively low position. Hence it is possible to increase the number of shelves 31 or lower the installation positions of the shelves 31.

Further, in the automated warehouse 1 of the present preferred embodiment, as illustrated in FIG. 5, the length L of each of the moving mechanism 71a and the moving mechanism 71b in the extending direction of the travelling route 5 is one-half or less of the length of the shelf 31 in the extending direction of the travelling route 5. With this configuration, it is possible to simultaneously take the articles H on and out of a plurality of shelves 31 arrayed in the vertical direction at the same position in the extending direction of the travelling route 5.

An operating method for the automated warehouse 1 of one example of a preferred embodiment of the present invention includes a first step of arranging the slider 74a of the stacker crane 7A and the slider 74b of the stacker crane 7B at mutually different positions in the vertical direction; and a second step of arranging the stacker crane 7A and the stacker crane 7B after the first step such that the slider 74a of the stacker crane 7A and the slider 74b of the stacker crane 7B face the shelves 31 at the same position in the extending direction of the travelling route 5. In this operating method, it is possible to transfer the articles H on two shelves 31 at the same position in the extending direction of the travelling route 5, thus to rapidly carry a plurality of articles H.

An operating method for the automated warehouse 1 of another example of a preferred embodiment of the present invention includes a first step of arranging the stacker crane 7A such that the slider 74a of the stacker crane 7A faces the shelf 31 at the one-side end in the extending direction of the travelling route 5 when the stacker crane 7A is broken down; and a second step of making the stacker crane 7B carry the article H. In this operating method, when the stacker crane 7A is broken down, the stacker crane 7A is arranged such that the slider 74a faces the shelf 31 at the one-side end in the extending direction of the travelling route 5.

In the automated warehouse including the two stacker cranes, it is considered that, when one stacker crane is broken down, the one stacker crane blocks the shelf, to prevent the other stacker crane from transferring the article. Further, it is considered that the one stacker crane blocks the travelling route, to also prevent the other stacker crane from transferring the article to and from the shelves around the shelf blocked by the one stacker crane. In the operating method for the automated warehouse 1 of another example of a preferred embodiment of the present invention, the stacker crane 7A is arranged such that the slider 74a faces the shelves at the one-side end in the extending direction of the travelling route 5, and there is thus generated no shelf 31 to and from which the stacker crane 7B cannot transfer the article H. Accordingly, it is possible to continue to carry the article H by the stacker crane 7B, while holding small the number of shelves 31 to and from which the stacker crane 7B cannot transfer the articles H due to the stacker crane 7A being an obstacle.

In the second step, in the stacker crane 7A, restraint of the lift stage 73a to the mast 72a is released. Accordingly, when the article H is transferred to or from the shelf 31, to and from which the stacker crane 7B cannot transfer the article H due to the stacker crane 7A being an obstacle, it is possible to transfer the article H by manually moving the lift stage 73a of the stacker crane 7A.

Although a preferred embodiment of the automated warehouse of the present invention has been described above, the present invention is not restricted to the above preferred embodiment. The configuration, the number and the shape of each of the elements are not restricted to the configuration, the number and the shape thereof in the above preferred embodiment, and they can be appropriately changed.

In the present preferred embodiment, in the extending direction of the travelling route 5, one end portion of the housing 77a of the stacker crane 7A is preferably located at the same position as the one-side end portion 85a of the mast 72a; however, it may be arranged so as to be located at the other side (the second opening 22 side) from the one-side end portion 85a of the mast 72a. Similarly for the stacker crane 7B, the one end portion of the housing 77b may be arranged so as to be located on the one side (the first opening 21 side) from the other-side end portion 85b of the mast 72b.

Further, in the stacker crane 7A, a portion of at least one of the moving mechanism 71a, the travelling motor 78a, the transfer mechanism 75a and the lifting motor 82a may be arranged so as to be located at the same position as the one-side end portion 85a of the mast 72a in the extending direction of the travelling route 5. Similarly in the stacker crane 7B, a portion of at least one of the moving mechanism 71b, the travelling motor 78b, the transfer mechanism 75b and the lifting motor 82b may be arranged so as to be located at the same position as the other-side end portion 85b of the mast 72b in the extending direction of the travelling route 5.

The automated warehouse 1 of the above preferred embodiment has been described by giving the example in which the stacker crane 7A includes the pair of lift-stage-side travelling guiding wheels 79a, 79a and the pair of supports 80a, 80a. However, the present invention is not restricted to this example. For example, as the travelling driving wheel 76a of the stacker crane 7A, only one wheel may be arranged so as to overlap with the mast 72a when viewed from the vertical direction. With such a configuration, it is possible to further reduce a quantity of projection to the other side from the one-side end portion 85a of the mast 72a in the extending direction of the travelling route 5. As a result, the stacker crane 7B, which is arranged on the other side in the extending direction of the travelling route 5 of the stacker crane 7A while facing the stacker crane 7A, is able to be arranged more closely.

The automated warehouse 1 of the above preferred embodiment has been described by giving the example of including both the stacker crane 7A and the stacker crane 7B, but this is not restrictive, and at least either the stacker crane 7A or the stacker crane 7B may be included.

The automated warehouse 1 of the above preferred embodiment has been described by giving the example in which the stacker crane 7A includes the auxiliary moving mechanism 90a, but the present invention is not restricted to this example, and may be configured without the auxiliary moving mechanism 90a. It is also similar for the stacker crane 7B.

The automated warehouse 1 of the above preferred embodiment has been described by giving the example in which the stacker crane 7A (7B) and the controller 12 are connected via the cable guide 8(9), but the present invention is not restricted to this example. The stacker crane 7A (7B) may communicate with the controller 12 wirelessly instead of the cable guide 8(9) as one example of wired communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An automated warehouse comprising:
    a plurality of shelves on which articles are stored;
    a first stacker crane that travels along a travelling route, to place the articles on and take the articles out of each of the plurality of shelves which are arranged in an extending direction and a vertical direction of the travelling route, the travelling route including a first side and a second side that is different from the first side;
    a second stacker crane that is arranged on the second side of the travelling route in the extending direction with respect to the first stacker crane, and travels along the travelling route, to place the articles on and take the articles out of the plurality of shelves;
    a first power supply that supplies electric power to the first stacker crane;
    a second power supply that supplies electric power to the second stacker crane;
    a first controller that controls the first stacker crane; and
    a second controller that controls the second stacker crane; wherein
    the first power supply and the first controller are arranged at respective positions different from the first stacker crane and deviated from an extended line of the travelling route, are connected to the first stacker crane via a first cable, and are located adjacent to an end of the first side of the travelling route in the extending direction;
    the second power supply and the second controller are arranged at respective positions different from the second stacker crane and deviated from the extended line of the travelling route, are connected to the second stacker crane via a second cable, and are located adjacent to an end of the second side of the travelling route in the extending direction;
    the first stacker crane includes:
        a first moving mechanism including a first driving wheel that moves by rolling along the travelling route;
        a first travelling driver that drives the first driving wheel;
        a first mast that is an only mast of the first stacker crane and is provided in the vertical direction above the first moving mechanism;
        a first transfer mechanism including a first lift moveable along the first mast, and a first in-and-out mover arranged on the first lift and moveable toward and away from the plurality of shelves; and
        a first lifting driver that drives the first lift;

the first mast includes a first end that faces the first side of the travelling route in the extending direction;

the first moving mechanism, the first travelling driver, the first transfer mechanism, and the first lifting driver are each arranged such that a portion of at least one of the first moving mechanism, the first travelling driver, the first transfer mechanism, and the first lifting driver is aligned with the first end of the first mast, or arranged such that the first moving mechanism, the first travelling driver, the first transfer mechanism, and the first lifting driver are located on the second side of the travelling route in the extending direction with respect to the first end of the first mast;

the first driving wheel includes only one wheel, and the first driving wheel overlaps with the first mast when viewed from the vertical direction;

the second stacker crane includes:
  a second moving mechanism including a second driving wheel that moves by rolling along the travelling route;
  a second travelling driver that drives the second driving wheel;
  a second mast that is provided in the vertical direction above the second moving mechanism;
  a second transfer mechanism including a second lift movable along the second mast and including a second in-and-out mover arranged on the second lift and movable toward and away from the plurality of shelves; and
  a second lifting driver that drives the second lift;

the second mast includes a first end and a second end, the second end of the second mast facing the second side of the travelling route in the extending direction; and the second moving mechanism, the second travelling driver, the second transfer mechanism, and the second lifting driver are each arranged such that a portion of at least one of the second moving mechanism, the second travelling driver, the second transfer mechanism, and the second lifting driver is aligned with the second end of the second mast, or arranged such that the second moving mechanism, the second travelling driver, the second transfer mechanism, and the second lifting driver are located on the first side of the travelling route in the extending direction with respect to the second end of the second mast.

2. The automated warehouse according to claim 1, wherein the first moving mechanism, the first travelling driver, the first lifting driver, and the first cable are provided below a storage area in which the articles are stored on the plurality of shelves.

3. The automated warehouse according to claim 1, wherein a shelf of the plurality of shelves that is arranged at the end of the first side of the travelling route is arranged at a position, on and out of which the articles are able to be placed and taken by the first stacker crane that stops at the end of the first side of the travelling route.

4. The automated warehouse according to claim 1, wherein the first travelling driver and the first lifting driver project in a direction intersecting with the extending direction and the vertical direction of the travelling route.

5. The automated warehouse according to claim 4, wherein, below a shelf of the plurality of shelves that is at a lowest level, the first travelling driver and the first lifting driver project to respective positions overlapping with a storage area in which the articles are stored on the plurality of shelves when viewed from the vertical direction.

6. The automated warehouse according to claim 1, wherein
  the first mast includes a second end that faces the second side of the travelling route in the extending direction;
  the first driving wheel is arranged on the first side of the travelling route in the extending direction with respect to the second end of the first mast;
  the first moving mechanism includes:
    a first guiding wheel that is arranged on the second side of the travelling route in the extending direction with respect to the second end of the first mast and moves by rolling along the travelling route; and
    a pair of first supports which support the first guiding wheel, are arranged on the second side of the travelling route in the extending direction with respect to the second end of the first mast, and are arranged with the travelling route located therebetween in a width direction intersecting with the extending direction and the vertical direction of the travelling route; and
  a space into which the first lift is able to enter from the vertical direction is provided between the pair of first supports in the width direction.

7. The automated warehouse according to claim 1, wherein a length of each of the first moving mechanism and the second moving mechanism in the extending direction of the travelling route is approximately one-half or less of a length of a shelf of the plurality of shelves in the extending direction of the travelling route.

8. The automated warehouse according to claim 1, wherein, in a direction intersecting with the extending direction and the vertical direction of the travelling route, the first power supply and the first controller are located on a side of the travelling route that is opposite from a side of the travelling route where the second power supply and the second controller are located.

9. An operating method for an automated warehouse, the method comprising:
  providing an automated warehouse comprising:
    a plurality of shelves on which articles are stored;
    a first stacker crane that travels along a travelling route, to place the articles on and take the articles out of each of the plurality of shelves which are arranged in an extending direction and a vertical direction of the travelling route, the travelling route including a first side and a second side that is different from the first side;
    a second stacker crane that is arranged on the second side of the travelling route in the extending direction with respect to the first stacker crane, and travels along the travelling route, to place the articles on and take the articles out of the plurality of shelves;
    a first power supply that supplies electric power to the first stacker crane;
    a second power supply that supplies electric power to the second stacker crane;
    a first controller that controls the first stacker crane; and
    a second controller that controls the second stacker crane; wherein
    the first power supply and the first controller are arranged at respective positions different from the first stacker crane and deviated from an extended line of the travelling route, are connected to the first stacker crane via a first cable, and are located adjacent to an end of the first side of the travelling route in the extending direction;

the second power supply and the second controller are arranged at respective positions different from the second stacker crane and deviated from the extended line of the travelling route, are connected to the second stacker crane via a second cable, and are located adjacent to an end of the second side of the travelling route in the extending direction;

the first stacker crane includes:
- a first moving mechanism including a first driving wheel that moves by rolling along the travelling route;
- a first travelling driver that drives the first driving wheel;
- a first mast that is an only mast of the first stacker crane and is provided in the vertical direction above the first moving mechanism;
- a first transfer mechanism including a first lift moveable along the first mast, and a first in-and-out mover arranged on the first lift and moveable toward and away from the plurality of shelves; and
- a first lifting driver that drives the first lift;

the first mast includes a first end that faces the first side of the travelling route in the extending direction;

the first moving mechanism, the first travelling driver, the first transfer mechanism, and the first lifting driver are each arranged such that a portion of at least one of the first moving mechanism, the first travelling driver, the first transfer mechanism, and the first lifting driver is aligned with the first end of the first mast, or arranged such that the first moving mechanism, the first travelling driver, the first transfer mechanism, and the first lifting driver are located on the second side of the travelling route in the extending direction with respect to the first end of the first mast;

the first driving wheel includes only one wheel, and the first driving wheel overlaps with the first mast when viewed from the vertical direction;

the second stacker crane includes:
- a second moving mechanism including a second driving wheel that moves by rolling along the travelling route;
- a second travelling driver that drives the second driving wheel;
- a second mast that is provided in the vertical direction above the second moving mechanism;
- a second transfer mechanism including a second lift movable along the second mast and including a second in-and-out mover arranged on the second lift and movable toward and away from the plurality of shelves; and
- a second lifting driver that drives the second lift;

the second mast includes a first end and a second end, the second end of the second mast facing the second side of the travelling route in the extending direction; and the second moving mechanism, the second travelling driver, the second transfer mechanism, and the second lifting driver are each arranged such that a portion of at least one of the second moving mechanism, the second travelling driver, the second transfer mechanism, and the second lifting driver is aligned with the second end of the second mast, or arranged such that the second moving mechanism, the second travelling driver, the second transfer mechanism, and the second lifting driver are located on the first side of the travelling route in the extending direction with respect to the second end of the second mast;

a first step of arranging the first transfer mechanism and the second transfer mechanism at mutually different positions in the vertical direction; and a second step of arranging the first stacker crane and the second stacker crane after the first step such that the first transfer mechanism and the second transfer mechanism face the plurality of shelves at a same position in a direction intersecting with the extending direction and the vertical direction of the travelling route.

10. An operating method for an automated warehouse, the method comprising:

providing an automated warehouse comprising:
- a plurality of shelves on which articles are stored;
- a first stacker crane that travels along a travelling route, to place the articles on and take the articles out of each of the plurality of shelves which are arranged in an extending direction and a vertical direction of the travelling route, the travelling route including a first side and a second side that is different from the first side;
- a second stacker crane that is arranged on the second side of the travelling route in the extending direction with respect to the first stacker crane, and travels along the travelling route, to place the articles on and take the articles out of the plurality of shelves;
- a first power supply that supplies electric power to the first stacker crane;
- a second power supply that supplies electric power to the second stacker crane;
- a first controller that controls the first stacker crane; and
- a second controller that controls the second stacker crane; wherein the first power supply and the first controller are arranged at respective positions different from the first stacker crane and deviated from an extended line of the travelling route, are connected to the first stacker crane via a first cable, and are located adjacent to an end of the first side of the travelling route in the extending direction;

the second power supply and the second controller are arranged at respective positions different from the second stacker crane and deviated from the extended line of the travelling route, are connected to the second stacker crane via a second cable, and are located adjacent to an end of the second side of the travelling route in the extending direction;

the first stacker crane includes:
- a first moving mechanism including a first driving wheel that moves by rolling along the travelling route;
- a first travelling driver that drives the first driving wheel;
- a first mast that is an only mast of the first stacker crane and is provided in the vertical direction above the first moving mechanism;
- a first transfer mechanism including a first lift moveable along the first mast, and a first in-and-out mover arranged on the first lift and moveable toward and away from the plurality of shelves; and
- a first lifting driver that drives the first lift;

the first mast includes a first end that faces the first side of the travelling route in the extending direction;

the first moving mechanism, the first travelling driver, the first transfer mechanism, and the first lifting driver are each arranged such that a portion of at least one of the first moving mechanism, the first travelling driver, the first transfer mechanism, and the first lifting driver is aligned with the first end of the first mast, or arranged such that the first moving mechanism, the first travelling driver, the first transfer mechanism, and the first lifting driver are located on the second side of the travelling route in the extending direction with respect to the first end of the first mast;

the first driving wheel includes only one wheel, and the first driving wheel overlaps with the first mast when viewed from the vertical direction;

the second stacker crane includes:
- a second moving mechanism including a second driving wheel that moves by rolling along the travelling route;
- a second travelling driver that drives the second driving wheel;
- a second mast that is provided in the vertical direction above the second moving mechanism;
- a second transfer mechanism including a second lift movable along the second mast and including a second in-and-out mover arranged on the second lift and movable toward and away from the plurality of shelves; and
- a second lifting driver that drives the second lift;

the second mast includes a first end and a second end, the second end of the second mast facing the second side of the travelling route in the extending direction; and the second moving mechanism, the second travelling driver, the second transfer mechanism, and the second lifting driver are each arranged such that a portion of at least one of the second moving mechanism, the second travelling driver, the second transfer mechanism, and the second lifting driver is aligned with the second end of the second mast, or arranged such that the second moving mechanism, the second travelling driver, the second transfer mechanism, and the second lifting driver are located on the first side of the travelling route in the extending direction with respect to the second end of the second mast;

a first step of arranging the first stacker crane at the end of the first side of the travelling route when the first stacker crane is broken down; and a second step of making the second stacker crane carry the articles.

11. The operating method according to claim 10, wherein in the second step, restraint of the first lift to the first mast is released in the first stacker crane.

\* \* \* \* \*